United States Patent [19]
Anderson

[11] Patent Number: 6,084,890
[45] Date of Patent: Jul. 4, 2000

[54] METHOD AND APPARATUS FOR COMBINING CARRIER SIGNALS

[75] Inventor: Dale Robert Anderson, Ft. Worth, Tex.

[73] Assignee: Motorola, Inc., Schaumburg, Ill.

[21] Appl. No.: 08/977,914

[22] Filed: Nov. 25, 1997

[51] Int. Cl.[7] ...................................................... H04J 1/00
[52] U.S. Cl. ............................................ 370/480; 455/103
[58] Field of Search ................................. 370/320, 335, 370/342, 441, 464, 479, 480; 455/333, 103, 108, 110; 329/304, 375

[56] References Cited

U.S. PATENT DOCUMENTS

| | | | |
|---|---|---|---|
| 4,558,283 | 12/1985 | Yamagiwa | 328/160 |
| 5,148,128 | 9/1992 | Mazumder | 332/103 |
| 5,355,101 | 10/1994 | Ichihara et al. | 332/103 |
| 5,708,399 | 1/1998 | Fujii et al. | 332/103 |
| 5,912,975 | 12/1985 | Schott | 381/1 |

*Primary Examiner*—Huy D. Vu
*Assistant Examiner*—Alexander Boakye
*Attorney, Agent, or Firm*—Richard A. Sonnentag; Mario J. Donato, Jr.

[57] ABSTRACT

A method and apparatus of combining carrier signals (110, 111) includes in a coupler (125) phase shifting signals (110, 111) by substantially 90 degrees to produce phase shifted signals (120, 121), coupling signals (110, 121) to produce a coupled signal (130) and the signals (111, 120) to produce a coupled signal (140). In phase shifters (450, 460), the coupled signals (130, 140) are independently phase shifted according to two independent frequency selective phase shifting functions (150, 160) to produce phase shifted coupled signals (170, 180) which are combined at combiner (190) to produce a combined carrier signal (199). A phase shifting attribute of functions (150, 160) is divided over predetermined frequency bands (210, 220, 230). Over the frequency bands (210) phase shift (260) leads phase shift (250) and lags over the frequency band (230) by substantially 90 degrees.

17 Claims, 5 Drawing Sheets

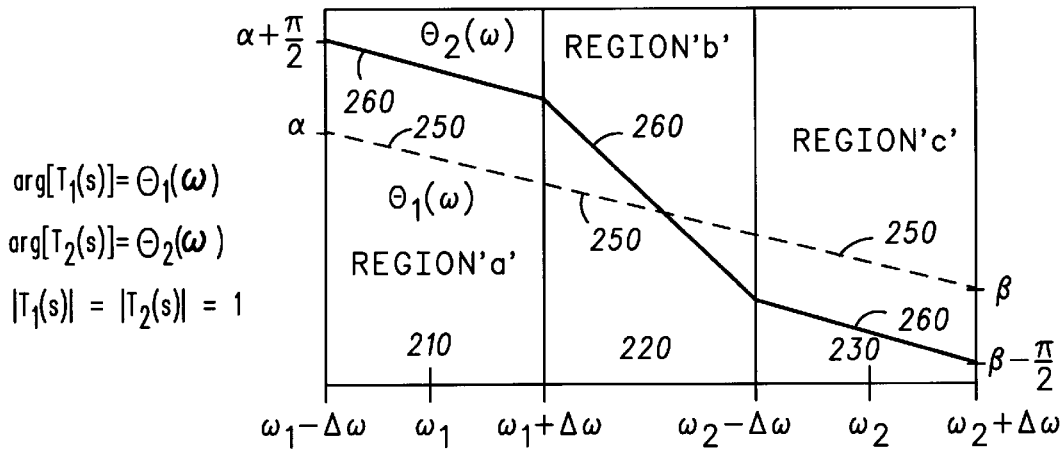

$$\arg[T_1(s)] = \Theta_1(\omega)$$
$$\arg[T_2(s)] = \Theta_2(\omega)$$
$$|T_1(s)| = |T_2(s)| = 1$$

$$|\Theta_1(\omega) - \Theta_2(\omega)| = \frac{\pi}{2}$$

$$\frac{d^{(n+1)}}{d\omega} \Theta_1(\omega) = \frac{d^{(n+1)}}{d\omega} \Theta_2(\omega) = 0 \quad \text{FOR } n=1,2,3\ldots$$

$$V_{O_3} = \frac{V_2}{\sqrt{2}} * e^{j\Theta_1(\omega_1)} + \frac{V_2}{\sqrt{2}} * e^{-j\frac{\pi}{2}} * e^{j\Theta_1(\omega_2)} \quad ]\text{—}270$$

$$V_{O_4} = \frac{V_2}{\sqrt{2}} * e^{j\Theta_2(\omega_2)} + \frac{V_1}{\sqrt{2}} * e^{-j\frac{\pi}{2}} * e^{j\Theta_2(\omega_1)} \quad ]\text{—}280$$

$$\Theta_2(\omega_1) = \Theta_1(\omega_1) + \frac{\pi}{2} \quad ]\text{—}215$$

$$\Theta_2(\omega_2) = \Theta_1(\omega_2) - \frac{\pi}{2} \quad ]\text{—}235$$

$$V_{O_4} = \frac{V_2}{\sqrt{2}} * e^{j(\Theta_1(\omega_2) - \frac{\pi}{2})} + \frac{V_1}{\sqrt{2}} * e^{-j\frac{\pi}{2}} * e^{j(\Theta_1(\omega_1) + \frac{\pi}{2})} = V_{O_3} \quad ]\text{—}291$$

*FIG.2*

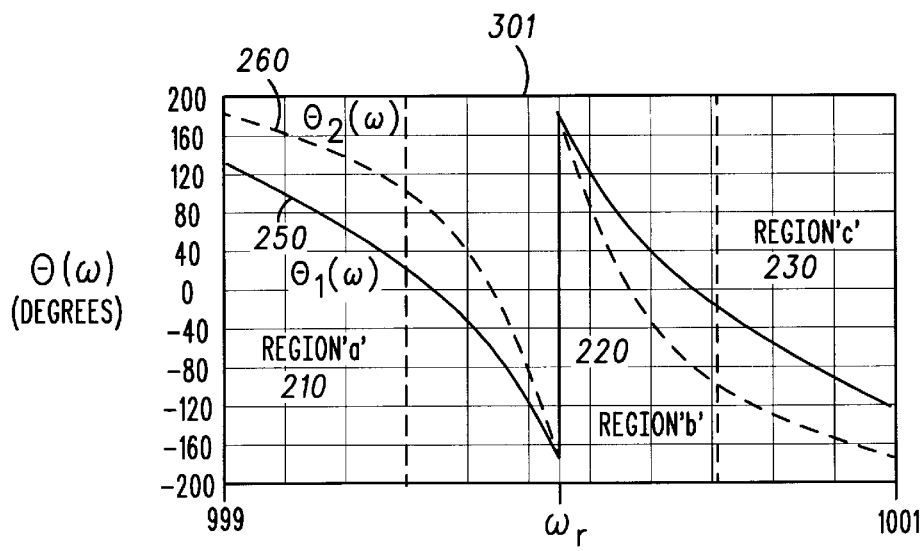

$$T_1(s) = \left[ \frac{s^2 - \left(\frac{2*\omega_r*s}{Q}\right) + w_r^2}{s^2 + \left(\frac{2*\omega_r*s}{Q}\right) + w_r^2} \right]^3 \Biggr\} 150$$

$$T_2(s) = \left[ \frac{s^2 - \left(\frac{2*\omega_r*s}{Q}\right) + w_r^2}{s^2 + \left(\frac{2*\omega_r*s}{Q}\right) + \omega_r^2} \right] * \left[ \frac{s^2 - \left(\frac{2*\omega_r*s}{2Q}\right) + w_r^2}{s^2 + \left(\frac{2*\omega_r*s}{2Q}\right) + \omega_r^2} \right] * \left[ \frac{s^2 - \left(\frac{2*\omega_r*s}{3Q}\right) + w_r^2}{s^2 + \left(\frac{2*\omega_r*s}{3Q}\right) + \omega_r^2} \right]$$

*FIG.3*

METHOD AND APPARATUS FOR COMBINING CARRIER SIGNALS

FIELD OF THE INVENTION

The present invention relates to a method and apparatus, and more particularly, for combining radio frequency signal carriers in a code division multiple access communication system.

BACKGROUND OF THE INVENTION

In a code division multiple access (CDMA) communication system, a CDMA forward link signal which is a combination of several data channels is modulated onto a carrier signal to form a CDMA carrier signal. Multiple CDMA carrier signals are combined together in a combiner to form a combined signal before being transmitted from an antenna. The CDMA carrier signals each have a different center frequency, and it may be as close as a channel bandwidth of the system. Generally, each carrier signal is passed through a band-pass filter. These filters should have a very sharp roll-off, which is a characteristic of a high quality factor, to filter coupled components of other carriers at frequencies away from the center frequency, and provide very low attenuation loss at the center frequency. Generally, the filters should have a high loaded quality factor and low attenuation loss at the center frequency. In a CDMA system where channel bandwidth is in the order of 1.2 MHz, cavity filters may be used. Cavity filters typically provide loaded filter quality factor of at least 50,000. In the prior art, cavity filters normally meet the requirements of high filter quality factor and low center frequency insertion loss, however, they are very bulky and expensive.

As the physical size and cost of the CDMA system hardware is reduced, the use of bulky cavity filters becomes highly undesirable. Moreover, cavity filters are expensive to manufacture, and very often, do not provide consistent performance among the manufactured filters. As a result, ceramic filters that provide the option of small size and consistent performance are used as a substitute for cavity filters. However, ceramic filters do not provide high filter loaded quality factor and low attenuation loss. To maintain low ceramic filter attenuation loss, the carrier signals being combined are forced to be at frequencies far away from each other. This would allow a degradation in the ceramic filter roll-off attenuation which is a degradation in quality factor while maintaining low attenuation loss. For example, carrier signals at alternate channel frequencies are generally combined with the use of cavity filters. In contrast, with the use of ceramic filters, the carrier signals that are combined have a frequency separation of about several frequency bandwidths of the system. The inability to combine carrier signals at close frequency range with the use of ceramic filters would greatly reduce the capacity of a CDMA system.

Therefore, there is a need for an improved method and apparatus of combining carrier signals.

BRIEF DESCRIPTION OF DRAWINGS

FIG. 2 depicts phase change characteristics of all-pass networks according to various aspects of the present invention.

FIG. 3 depicts graphical and mathematical representations of the phase shifting functions performed in the all-pass networks.

DETAILED DESCRIPTION OF THE PREFERRED EMBODIMENTS(S)

Figure 1:
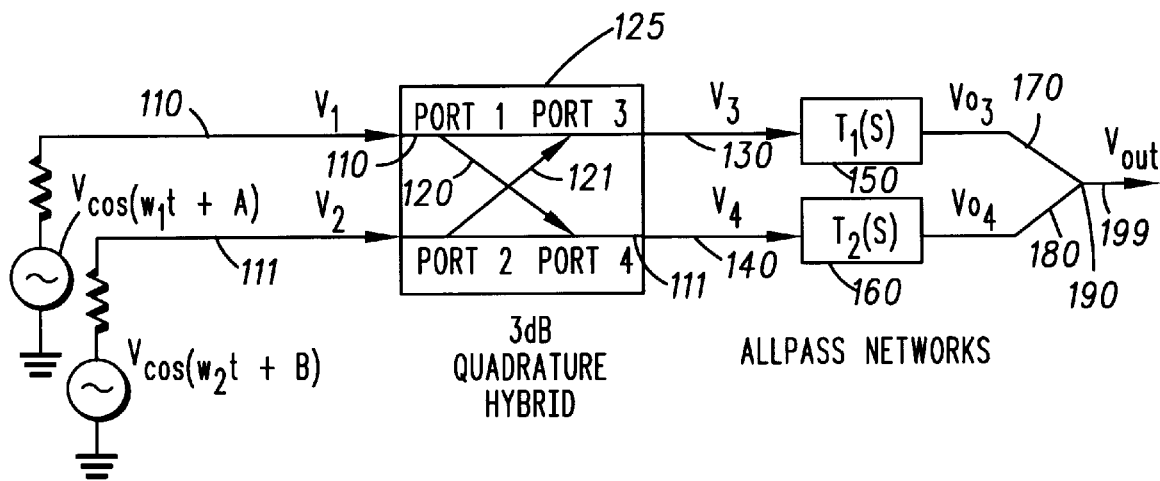
FIG. 1 depicts a block diagram for combining two carrier signals according to one aspect of the present invention.

According to one aspect of the present invention and with reference to FIG. 1, a method of combining a first and second carrier signals, 110 and 111, includes a step of phase shifting the first and second carrier signals, 110 and 111, by substantially 90 degrees, and a step of coupling the first signal 110 and a phase shifted second signal 121 to produce a first combined signal 130. Similarly, the second signal 111 is coupled at the coupling step with a phase shifted first signal 120 to produce a second combined signal 140. The mathematical relationships, 131 and 141, between root mean square (RMS) values and phase of signals 130, 110 and 111, and 140, 110 and 111 are respectively shown in FIG. 1. In a second phase shifting step, the first and second combined signals, 130 and 140, are independently phase shifted according to two independent phase shifting functions, 150 and 160, to produce a first and second combined phase shifted signals, 170 and 180. The phase shifting functions, 150 and 160, are frequency selective functions. The first and second phase shifted combined signals, 170 and 180, are combined at 190 to produce a combined carrier signal 199.

With reference to FIG. 2, a frequency selective attribute of each of the first and second frequency selective phase shifting functions, 150 and 160 shown in FIG. 1, is divided into a first, a second and a third predetermined frequency bands, 210, 220 and 230. The frequency selective attribute is the phase shifting attribute in each of the functions 150 and 160. Since, function 150 and 160 are all-pass functions indicating no signal amplitude gain or loss at any frequency, the only attribute that is frequency selective is the phase shifting characteristics according to the preferred embodiment of the present invention. The first and third frequency bands, 210 and 230, are substantially equal to a first frequency bandwidth of the first carrier signal 110 and to a second frequency bandwidth of the second carrier signal 111, respectively. Also, the second frequency band 220 is more than a nominal frequency bandwidth. In practice, the nominal bandwidth may be set equal to a channel bandwidth of a code division multiple access (CDMA) system as a matter of convenience. Furthermore, the first and third frequency bands, 210 and 230, are centered substantially at a first and second center frequencies of the first and second carrier signals, 110 and 111.

The phase shifting according to the first and second functions, 150 and 160 shown in FIG. 1, over frequency bands 210, 220 and 230, are substantially linear phase shifting, and are shown in FIG. 2 at 250 and 260 respectively. The phase differences between 250 and 260 over the frequency bands 210, 220 and 230 are also shown in FIG. 2. Over the frequency bands 210 and 230, the absolute phase difference is substantially equal to 90 degrees. Over the frequency band 210, phase shift 260 is leading phase shift 250 by substantially 90 degrees. However, the linear phase shift 260 over the frequency band 220 takes more phase shift than 250, such that, over the frequency band 230, phase shift 260 is lagging phase shift 250 by substantially 90 degrees. The resulting signals 170 and 180 mathematical representations are shown in FIG. 2 at 270 and 280 respectively. After substituting phase relationships 215 and 235, which are the mathematical representation of phase relationships over frequency bands 210 and 230 respectively, the signals 170 and 180 are shown to be substantially equal signals as shown at 291. In the preferred embodiment, since first and second combined signals 130 and 140 are maintained to have substantially equal average powers and functions 150 and 160 are substantially all-pass functions without any amplitude loss or gain, the signals 170 and 180 as are represented by equation 291 would have substantially equal average power. As a result, signals 170 and 180 are combined constructively without any power loss to produce the combined signal 199. Therefore, the signals 110 and 111 are combined to form signal 199 without requiring high quality factor filters at minimum loss of the combined signal power, according to one benefit of the present invention.

With reference to FIG. 3, the functions 150 and 160 which have respectively phase shift characteristics of 250 and 260 are shown by their graphical and mathematical representations. The function 150 is a cascaded cube of a second order all-pass function. Each second order function in 150 has the same quality factor. In function 160, the cascaded second order functions have different quality factors. The graphical representations of phase change characteristics 250 and 260 are shown in 301. The 90 degrees absolute phase shift difference between 250 and 260 over the frequency bands 210 and 230 is deviated by only eight degrees. Such deviation may be allowed in practical applications without substantially deviating from the scope of the present invention.

The frequency band 220 may be as narrow as a practical application of the present invention allows. In a CDMA communication system where channel bandwidth is predetermined, the frequency band 220 is preferred to be substantially equal to a channel bandwidth. As a result, two carrier signals that are only one channel frequency apart are combined according to the present invention. The phase change characteristics over the frequency band 210, 220 and 230 are accomplished by circuit elements having quality factors much lower than the required quality factor of cavity filters. In the preferred embodiment, the quality factors of each cascaded block is from 70 to 210.

Figure 4:
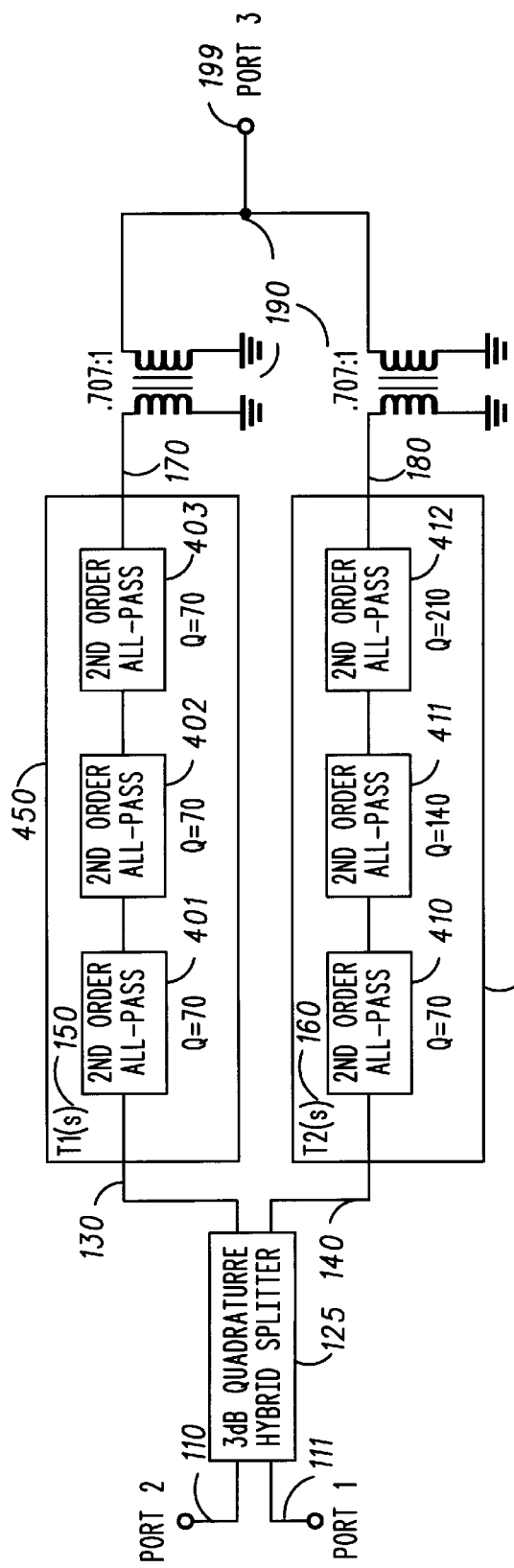
FIG. 4 depicts a block diagram for hardware implementation of combining two carrier signals according to another aspects of the present invention.

With reference to FIG. 4, a block diagram of the hardware implementation for combining the first and second carrier signals, 110 and 111, according to another aspect of the present invention is shown. The coupler 125 receiving the first and second carrier signals, 110 and 111, outputs the first and second coupled signals 130 and 140. The coupler 125 couples the first signal 110 and the substantially 90 degrees phase shifted version of the second signal 111, which is the signal 121, to produce the first coupled signal 130. The second signal 111 and the substantially 90 degrees phase shifted version of the first signal 110, which is the signal 120, are coupled to produce the second coupled signal 140.

A phase shifter 450 receiving the first coupled signal 130 outputs the first phase shifted coupled signal 170. The phase shifter 450 includes a cascade of three second order all-pass blocks, 401, 402 and 403, which all have the same quality factor according to function 150. A phase shifter 460 receiving the second coupled signal 140 outputs the second phase shifted coupled signal 180. The phase shifter 460 includes a cascade of three second order all-pass blocks, 410, 411 and 412, each having a different quality factor. The first section 410 has a quality factor equal to 70, the second section 411 has a second quality factor twice as high as the quality factor of the first section 410, and the third section 412 has a quality factor thrice as high as the quality factor of the first section 410. The combiner 190 receiving the first and second phase shifted coupled signals 170 and 180 outputs the combined signal 199. The combiner 190 may include impedance transformer for matching the impedance for proper combining.

Figure 5:
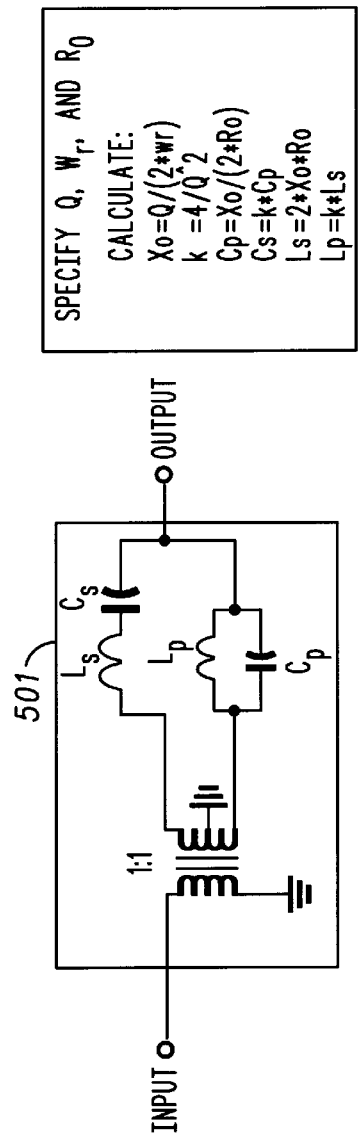
FIG. 5 depicts a block diagram of a second order all-pass function used as the building block in various sections of all pass networks.

With reference to FIG. 5, a second order all-pass block having a combination of series and parallel inductive and capacitive components is shown. The internal components of block 501 are modified according to the requirements of the second order all-pass blocks 401–403, and 410–412. Since blocks 401–403 have identical requirements, the same component values may be used for all three blocks. However, for blocks 410, 411 and 412, the internal components are modified to meet each block's required quality factor.

Figure 6:
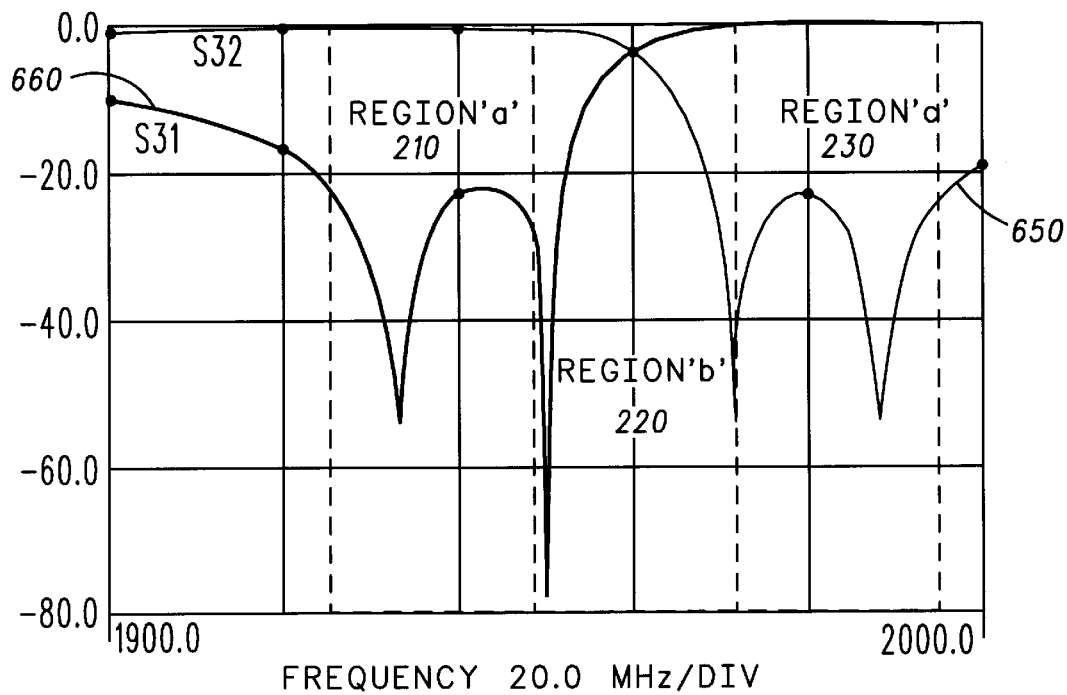
FIG. 6 depicts a frequency response of all-pass networks.

With reference to FIG. 6, an overall frequency response of the combiner according to the present invention is shown. The frequency responses 650 and 660 are respectively the frequency responses of functions 150 and 160 respectively. The frequency responses 650 and 660 are shown to have adequate respective attenuation of carrier signals outside the frequency range 210 and 230. As a result, any cross-coupling of signals is prevented by providing attenuation at frequencies other than the frequency band of the interest.

Figure 7:
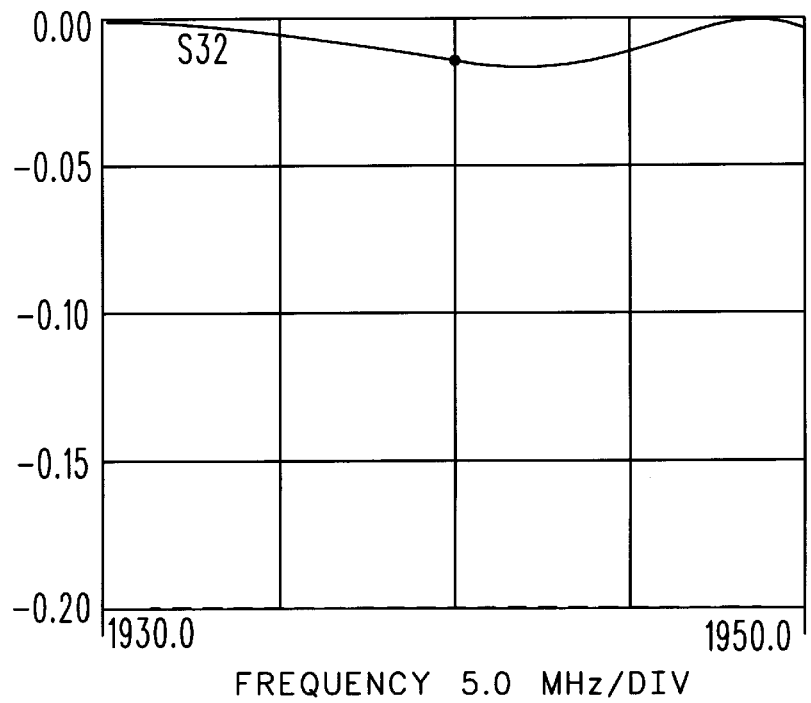
FIG. 7 depicts an insertion loss response of the all-pass networks.

With reference to FIG. 7, the frequency response of the functions 150 and 160 is shown to be substantially identical at their respective frequency of interest. This is a close up view of frequency response 650 over frequency band 210 and frequency response 660 over the frequency band 230. The attenuation of in-band signal according to functions 150 and 160 is very small, less than 0.03 dB. Therefore, according to a benefit of the present invention, two carrier signals having close center frequencies are combined without substantially any loss of amplitude in any of the signals, and circuits realization is accomplished with components having low quality factors.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What is claimed is:

1. A method of combining a first carrier signal having a first frequency bandwidth and a first center frequency, and a second carrier signal having a second frequency bandwidth and a second center frequency, comprising the steps of:

phase-shifting said first and second signals to produce a first and second phase shifted signals;

coupling said first signal and said second phase shifted signal to produce a first combined signal, and said second signal and said first phase shifted signal to produce a second combined signal;

phase-shifting said first combined signal according to a first frequency selective phase shifting function to produce a first combined phase shifted signal, and said second combined signal according to a second frequency selective phase-shifting function to produce a second combined phase shifted signal; and combining said first and second combined phase shifted signal to produce a combined carrier signal.

2. The method as recited in claim 1 wherein said step of phase-shifting said first and second signals to produce a first and second phase shifted signals provides substantially 90 degrees of phase shift.

3. The method as recited in claim 1 wherein a frequency selective attribute of each of said first and second frequency selective phase-shifting functions is divided into a first, a second and a third predetermined frequency band.

4. The method as recited in claim 3 wherein said first frequency band is substantially equal to said first frequency bandwidth, and said third frequency band is substantially equal to said second frequency bandwidth.

5. The method as recited in claim 3 wherein said first frequency band is centered substantially at said first center frequency, and said third frequency band is centered substantially at said second center frequency.

6. The method as recited in claim 3 wherein said second phase-shifting is a linear phase shifting according to said first and second functions over said first and third frequency bands.

7. The method as recited in claim 3 wherein phase shifting according to said first function lags substantially 90 degrees from phase shifting according to said second function over said first frequency band.

8. The method as recited in claim 3 wherein phase shifting according to said first algorithm leads substantially 90 degrees from phase shifting according to said second function over said third frequency band.

9. The method as recited in claim 1 wherein said first and second combined signals average powers are substantially equal.

10. The method as recited in claim 1 wherein said first and second combined phase shifted signals average powers are substantially equal.

11. An apparatus for combining a first carrier signal having a first frequency bandwidth and a first center frequency, and a second carrier signal having a second frequency bandwidth and a second center frequency, comprising:

a coupler for receiving said first and second carrier signals, and outputting a first and second coupled signals;

a first phase shifter for receiving said first coupled signal and outputting a first phase shifted coupled signal;

a second phase shifter for receiving said second coupled signal and outputting a second phase shifted coupled signal; and a combiner for receiving said first and second phase shifted coupled signals and outputting a combined signal;

wherein said first phase shifter includes a first plurality of all pass second order phase shifter sections connected in series which said first coupled signal is input to an input of said plurality of second order sections to output said first phase shifted signal.

12. The apparatus as recited in claim 11 wherein said coupler couples said first signal and a substantially 90 degrees phase shifted version of said second signal to produce said first coupled signal, and said second signal and a substantially 90 degrees phase shifted version of said first signal to produce said second coupled signal.

13. The apparatus as recited in claim 11 wherein said first plurality of all pass second order phase shifter sections is equal to three sections.

14. The apparatus as recited in claim 11 wherein said second order sections in said first plurality have an equal quality factor.

15. The apparatus as recited in claim 11 wherein said second phase shifter includes a second plurality of all pass second order phase shifter sections connected in series which said second coupled signal is input to an input of said second plurality of second order sections to output said second phase shifted signal.

16. The apparatus as recited in claim 15 wherein said second plurality of all pass second order phase shifter sections is equal to three sections.

17. The apparatus as recited in claim 16 wherein a first section in said second plurality of all pass second order phase shifter sections series has a first quality factor, a second section has a second quality factor twice as high as said first quality factor, a third section has a third quality factor thrice as high as said first quality factor.

* * * * *